INVENTOR.
ERIC A. VON HIPPEL
BY
*Blair, Cesari & St. Onge*
ATTORNEYS

ELECTRONIC STYLUS FEED MECHANISM

Filed Aug. 26, 1968

INVENTOR.
ERIC A. VON HIPPEL
BY
Blair, Cesari & St. Onge
ATTORNEYS

INVENTOR.
ERIC A. VON HIPPEL
BY
Blair, Cesari + St. Onge
ATTORNEYS

United States Patent Office 3,541,579

Patented Nov. 17, 1970

3,541,579

ELECTRONIC STYLUS FEED MECHANISM

Eric A. von Hippel, Weston, Mass., assignor to Graphic Sciences, Inc., Danbury, Conn.

Filed Aug. 26, 1968, Ser. No. 755,097
Int. Cl. G01d 15/10
U.S. Cl. 346—139 13 Claims

ABSTRACT OF THE DISCLOSURE

A highly compliant pyrographic stylus for a rotary drum facsimile receiver has a long straight portion at one end for bearing against a copy being reproduced and is coiled into a spring at the other end to maintain a bearing force against the copy. The stylus is mounted in a cartridge which is contoured to provide access to a pair of grippers which grip the stylus and retract it from the copy when the reproduction process is completed. This facilitates loading and unloading of the copy. A bushing in the cartridge provides lateral restraint for the stylus and allows a greatly increased stylus length with consequent increase in its useful life before replacement is required. A protective boot enclosing the stylus shields that portion of the stylus which is retracted into the bushing during loading and unloading to prevent "fouling" of the bushing.

BACKGROUND OF THE INVENTION

Field of the invention

The invention relates to a rotary drum facsimile system and comprises a novel pyrographic stylus and cartridge, together with an automatic retracting apparatus for withdrawing the stylus from the drum after each reproduction. The invention is especially useful in conjunction with the facsimile system described in the copending application of Eric A. von Hippel et al. Ser. No. 753,542 filed Aug. 19, 1968 and assigned to the assignee of the present invention.

Prior art

Pyrographic styli are used to reproduce messages on sensitized paper. They do this by applying a current to selected areas of the paper in accordance with signals applied to the stylus. This current "burns" the paper or otherwise causes a visible chemical change at selected areas thereon to reproduce the message.

In order to provide a reproduction of acceptable quality, the stylus is arranged to contact the paper on which the message is to be reproduced; relative motion is provided between the paper and the stylus so that the stylus effectively sweeps over the paper. A spring or weight is usually provided to urge the stylus against the paper with a predetermined force; this compensates for stylus wear and helps insure a clear reproduction.

In some conventional facsimile systems using pyrographic styli, the stylus is fixedly attached near its end to a rigid supporting plate which provides resistance to lateral movement. The length of the stylus is limited to obtain the desired lateral restraint. A stylus of this type must frequently be replaced since each reproduction causes a greater percentage decrease in length due to wear than is the case with a stylus of greater length. This is especially a problem when the stylus is formed from a durable but soft material such as a stainless steel which is less likely to gouge the document reproduction than is the stylus of a harder material such as tungsten.

Some facsimile systems use pyrographic styli which are connected to a cantilevered beam. In addition to restricting the length of the stylus, such an arrangement undesirably limits its compliance.

When a copy sheet is being loaded or unloaded during the reproduction process, it is necessary to retract the stylus from the drum surface. In some conventional systems this is done by hand and carelessness at this stage can lead to damage of the stylus with consequent impairment, or total disablement, of the reproduction process. In other prior systems, the retraction of the stylus at the appropriate time is accomplished automatically or semi-automatically, but the mechanism utilized is needlessly complex and, in some cases, unreliable.

SUMMARY OF THE INVENTION

Objects of the invention

Accordingly, it is an object of the invention to provide an improved stylus for a rotary drum facsimile system.

Another object of the invention is to provide a stylus having a greatly extended useful life.

Yet another object of the invention is to provide an improved stylus of increased length.

A further object is to provide an improved stylus which obviates the use of a separate biasing spring for urging the stylus against the drum during reproduction.

Yet another object of the invention is to provide an improved stylus which is readily replaced when worn.

Yet another object of the invention is to provide an improved stylus cartridge in which the stylus is quickly mounted even by relatively unskilled personnel and which is readily removed from its environment to facilitate replacement of the stylus.

Still a further object of the invention is to provide a stylus retracting mechanism for retracting the stylus from the document after each reproduction.

Yet another object of the invention is to provide a stylus retracting mechanism that is simple and economical to manufacture and which is reliable in use.

The above and other and further objects and features of the invention will be more readily understood in conjunction with the detailed description of the invention which follows.

Brief description of the invention

The novel stylus system of the present invention uses a pyrographic stylus formed from a long, thin, hair-like, conductive wire having a straight stylus tip at one end. This wire is coiled around a central axis coincident with the stylus tip to form a spring at the other end. The stylus is fitted into a housing having separable front and rear faces snap-fitted to each other so that the housing and stylus together form a closed cartridge. The housing has an elongated central cavity for receiving the stylus spring. The distant end of the stylus is fixed to the cartridge housing, while the tip of the stylus protrudes through a bushing of restricted aperture in the housing for extension against the copy being reproduced.

In its unstressed state, the stylus spring occupies only a portion of the center cavity and the stylus tip extends a substantial distance beyond the bushing. When the cartridge is mounted for reproduction, it is positioned closely adjacent the drum holding the copy sheet on which the reproduction is to be made and the stylus tip is pushed against the copy sheet. This forces all but a short segment of the stylus tip back into the cartridge which thus serves as a stylus "reservoir." This in turn extends the spring portion of the stylus into the previously unoccupied portion of the cartridge cavity. The extended spring thus pushes on the stylus tip during reproduction and generates a stylus bias of predetermined mangitude to insure a good reproduction. It also feeds new portions of the stylus to the copy sheet as the stylus erodes during reproduction.

Portions of the housing are cut away to expose a section of the stylus body. This body section is gripped between two opposing surfaces of a retracting mechanism, one of which is movable into and out of contact with the stylus to retract it from the document after each reproduction cycle. The opposed surfaces are connected by an actuator arm to a solenoid. The solenoid is operable in synchronism with the drum driving means to release the stylus against the copy and to retract it at the appropriate times. The solenoid is spring loaded so that the solenoid arm retracts the stylus between reproductions when the solenoid input signal is removed.

A plastic boot connected to the stylus housing totally encloses all but the outermost tip of the stylus portion which projects from the bushing during a reproduction. Carbon particles or other efflux which are generated during the reproduction are thus prevented from accumulating on the inner portions of the stylus which are retracted into the bushing after a reproduction; these particles would otherwise ultimately clog the bushing aperture and lead to a malfunction of the stylus mechanism. Particles which accumulate on the outer tip of the stylus merely increase the effective thickness of the stylus in this region. When the stylus is retracted, the thickened portion merely pushes against the boot and causes it to "pucker" inwardly; the fouled surface is thus held outside the boot at all times.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Figure 1:
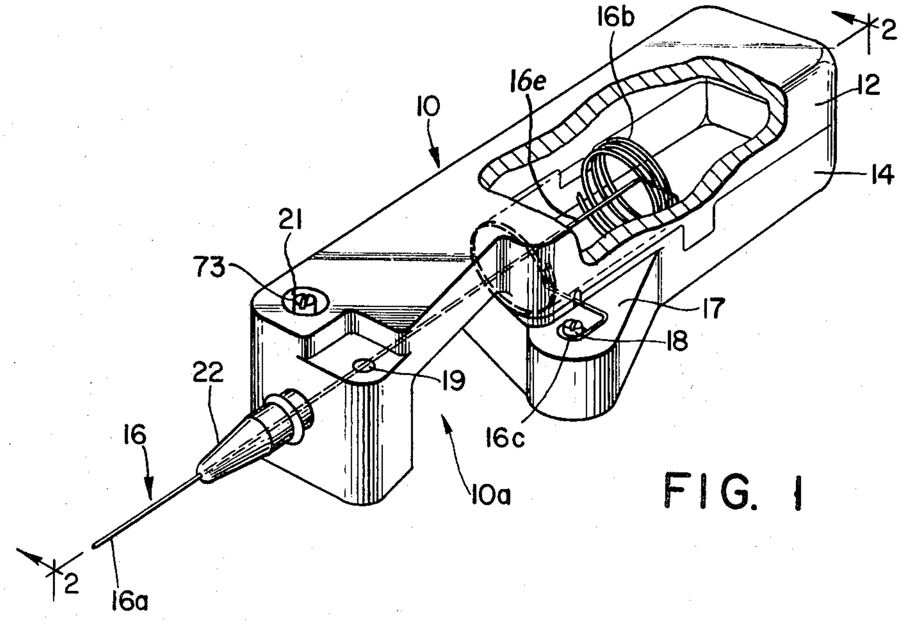
FIG. 1 is a view in perspective of the stylus cartridge of the present invention.

Considering FIG. 1 of the drawings in more detail, a stylus cartridge 10 of the present invention comprises an upper housing section 12 removably fitted to a lower housing section 14 and enclosing a stylus 16. The stylus 16 has a stylus tip **16*a* at one end and is coiled around its own axis into a spring 16*b* at the other end. The spring portion and the stylus segment 16*e* co-axial therewith is contained within a cavity 15 enclosed within the upper and lower housing sections 12 and 14 respectively. The spring coil terminates in an eye 16*c* through which a screw 18 extends into a wing 17 of the lower housing section 14; screw 18 preferably extends through wing 17 for mounting the cartridge for movement over a copy sheet as described below. The wing 17 and screw 18, together with an aperture 19, are provided for mounting the cartridge 10** adjacent a copy-bearing drum as will be described in more detail below.

Figures 2, 3B:
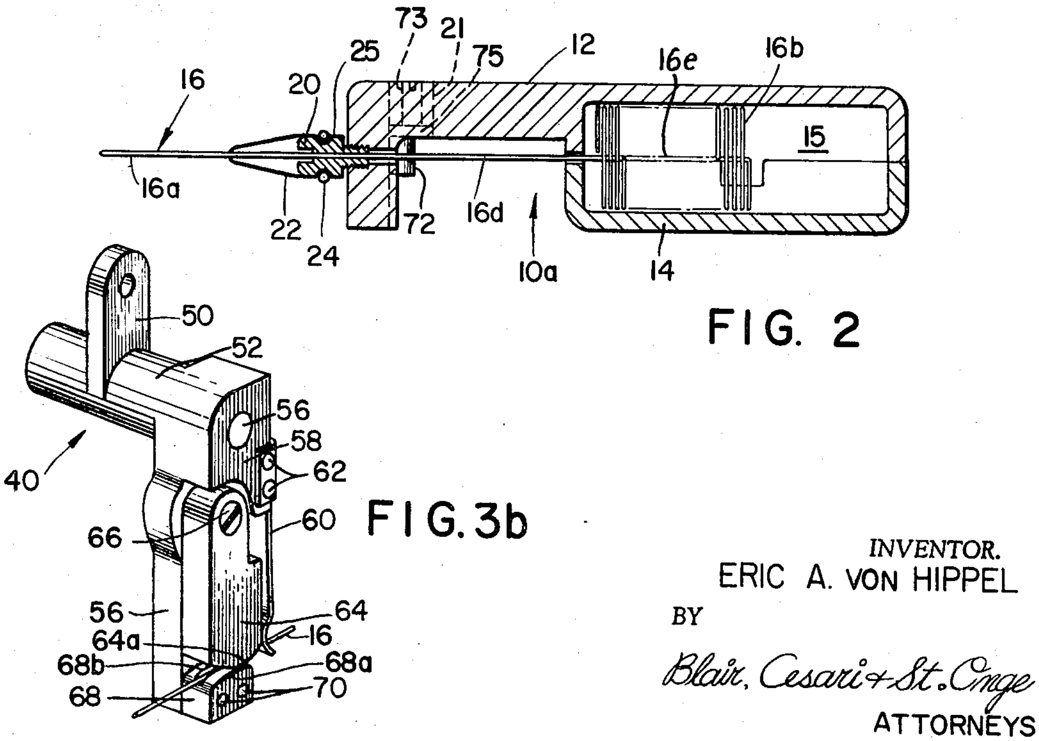
FIG. 2 is a side sectional view of the cartridge along the line 2—2 of FIG. 1.
FIG. 3*b* is a view in perspective of a portion of the stylus retracting mechanism.

As may be seen more clearly in FIG. 2, the cartridge has a laterally open arch **10*a* at its forward end through which an exposed portion 16*d* of the stylus extends. Mounted in an aperture 21 extending through the cartridge is a snugly fitting plug having an eccentric pin 72 and a slotted shaft 73 extending from a body 75; the body 75 is snugly but rotatably fitted within the aperture 21. The eccentric pin 72** provides an adjustment in operation of the stylus retracting mechanism as will be seen more fully below.

The forward end of stylus 16 projects through a central orifice in a bushing 20 threaded into housing section 12. A flexible boot 22 of plastic or the like is mounted on bushing 20 by means of an O-ring 24 which snaps into a groove 25 in bushing 20. The bushing 20 serves as a guide for the stylus 16; it limits the lateral movement of the stylus tip **16*a*** as the tip presses against it during reproduction.

In the unstressed condition shown in FIG. 2, the tip portion **16*a* of the stylus 16 extends a substantial distance beyond the forward edge of the boot 20 and the spring portion 16*b* occupies only a portion of the cavity 15. In this position, the spring portion 16*b* is unextended and it exerts no force on the stylus tip 16*a*. However, when the cartridge 10 is mounted adjacent a drum bearing a copy-sheet on which a reproduction is to be made, the tip of boot 20 is positioned only a slight distance from the drum and the drum then presses the stylus tip 16*a* through the boot 22 and bushing 20 into the cartirdge 10 so that only a relatively short length of the stylus tip extends beyond the boot. This compresses spring portion 16*b* so that initially it fills substantially the entire cavity 15; the compressed spring portion thereafter exerts an outward force on stylus tip 16*a*** to insure good contact between the stylus and the copy sheet.

As stylus tip **16*a* wears in use, spring portion 16*b* continually feeds a new tip portion toward the copy sheet to replace the worn portion. Thus, the cartridge 10** serves as a reservoir for the storage of stylus wire which it dispenses as it is needed. As a result, a substantially greater number of reproductions may be made before the cartridge of the present invention must be replaced than was heretofore the case. For example, while the stylus in many of the prior facsimile receivers must be replaced after as few as a hundred 8½" x 11" reproductions, the stylus of the present invention can be expected to provide upwards of 2000 8½" by 11" reproductions before replacement is required. This constitutes a dramatic advance in the state of the art.

Figure 3A:
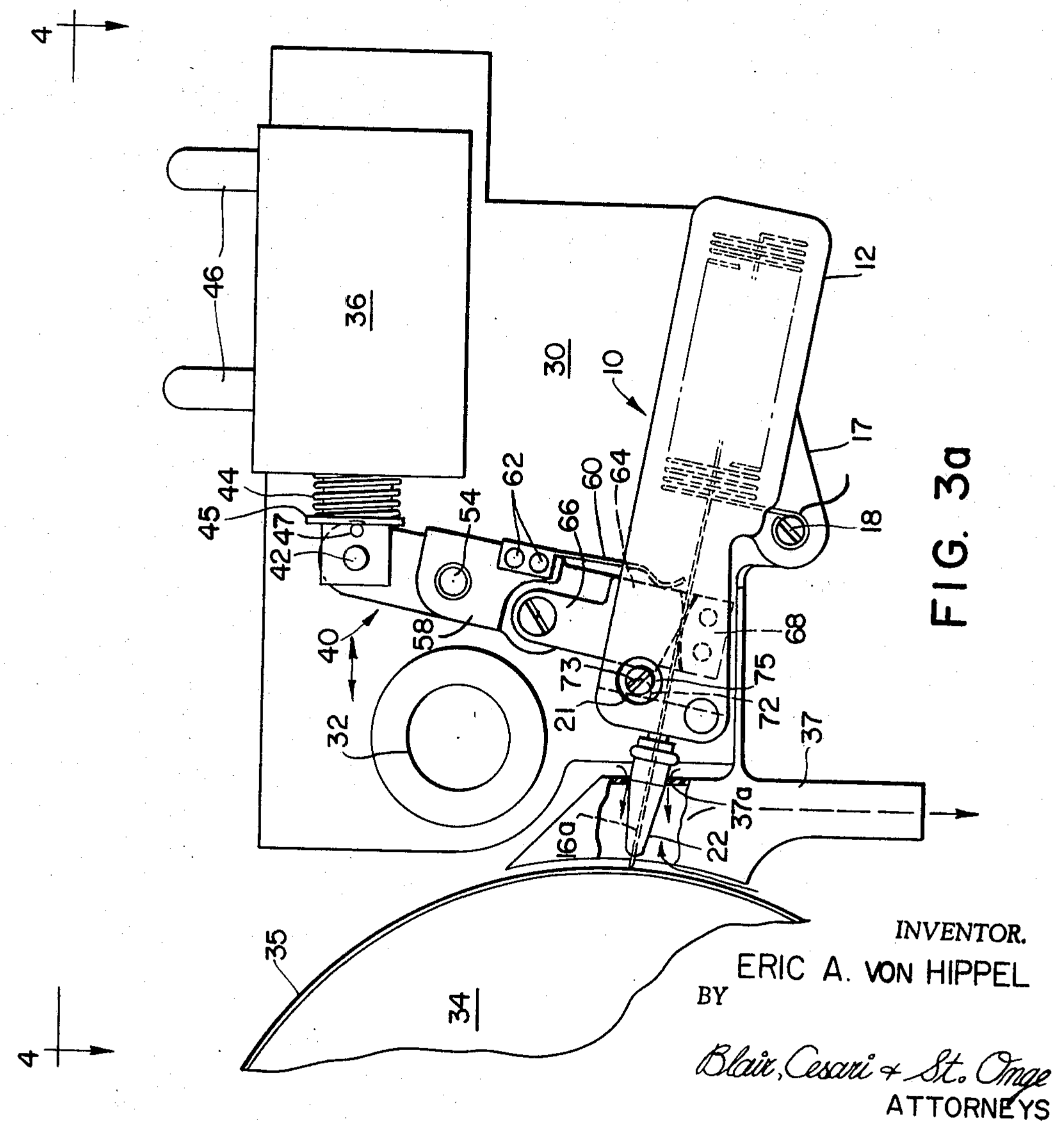
FIG. 3*a* is a side view of the stylus cartridge and stylus retracting mechanism positioned adjacent a document-bearing drum for reproduction.

When the cartridge 10 is mounted adjacent a drum bearing a copy-sheet on which a reproduction is to be made, the stylus must be retracted after the reproduction to allow unloading of the copy and loading of a new copy-sheet. FIG. 3*a* shows a retracting mechanism which is especially adapted to perform this function in conjunction with the present cartridge. A mounting head 30 has a transverse aperture 32 extending through it for reception of a guide bar along which the head moves adjacent a rotary drum 34 parallel to the drum axis. A copy-sheet 35 is mounted on drum 34 for reproduction by cartridge 10 which is mounted on head 30. The stylus 16 extends against the copy-sheet 35 from within cartridge 10 and boot 22. Boot 22 is fitted through a narrow aperture **37*a* in a vacuum nozzle 37 which is positioned adjacent drum 34 to remove carbon particles and other efflux generated during the reproduction process. The nozzle 37** is connected to an exhaust blower (not shown) which draws air into the nozzle and thence through an exhaust line as shown by the arrows in FIG. 3*a*.

A solenoid 36 having a double-armed plunger yoke 38 (see FIG. 4) is connected to a stylus actuator arm 40 via a pivot 42. A solenoid spring 44 extends between the solenoid housing and a washer 45 against which the spring pushes; the outward movement of the washer is limited by a pin 47 beyond washer 45 and extending through yoke 38. The solenoid 36 is electrically actuated via signals received at electrical terminals 46.

Figure 4:
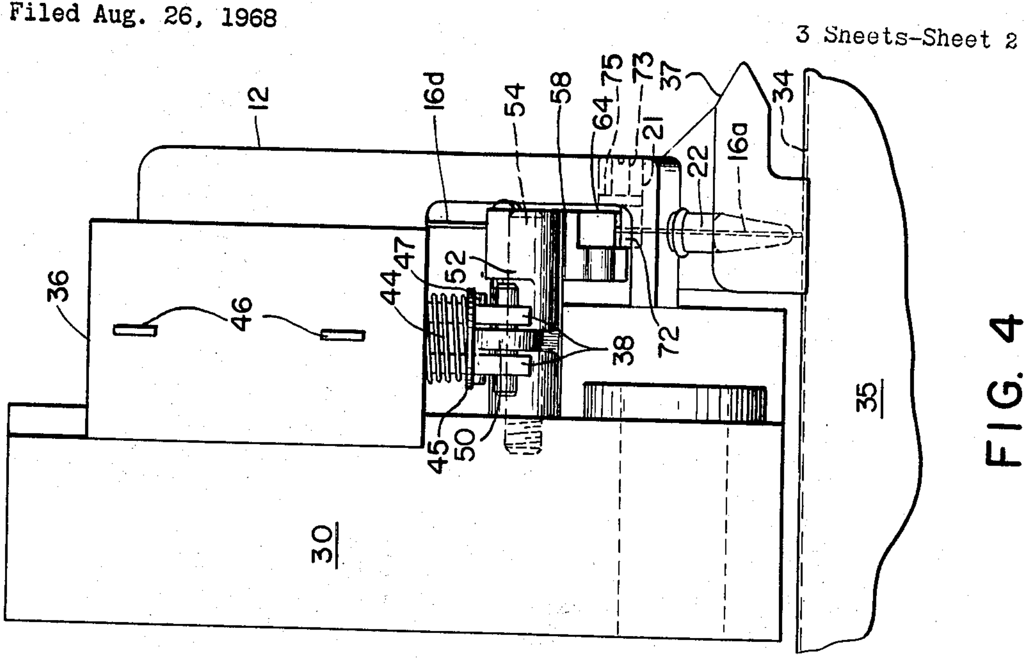
FIG. 4 is a top view of the cartridge and retracting mechanism taken along the line 4—4 of FIG. 3*a*.

As seen more clearly in FIGS. 3*b* and 4, the actuator arm 40 comprises a first flat arm portion 50 terminating in a transverse tubular portion 52 which is rotatably mounted on a pivot pin 54 (FIG. 4) extending into head 30. A second arm portion 56 extends downwardly from one end of tubular portion 52 and carries a block 58 on which a leaf spring 60 is mounted via rivets 62. A first dog 64 having a crown **64*a* is rotatably connected to arm 56 by means of a pivot pin 66, while a second dog 68 having a crown 68*a* and an arcuate slot 68*b* opposite crown 64*a* is securely fastened to arm 56 below dog 64 by rivets 70. Pivot pin 66 is preferably formed with an eccentric body portion to allow adjustment of the gap between the opposed crowns 64*a* and 68*a*. The stylus 16 nests in groove 68*b* in dog 68**.

Figures 5, 6:
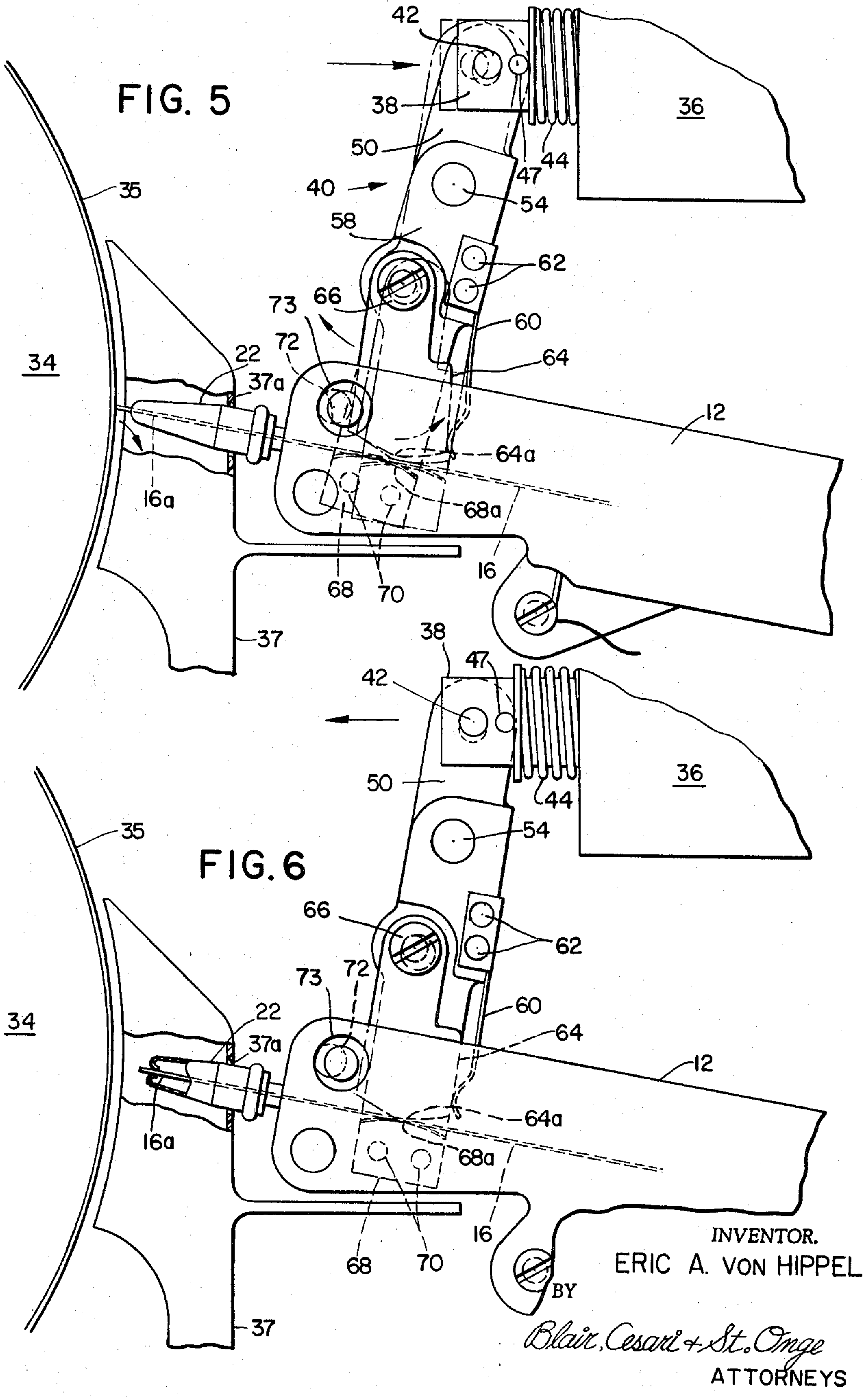
FIGS. 5 and 6 are enlarged side views showing the stylus cartridge in retracted and advanced positions respectively and illustrating the operation of the stylus retracting mechanism.

The operation of the retracting mechanism will now be explained in detail. Referring to FIG. 5 of the drawings, arm 56 is shown partly in solid lines in its extended position and in dotted lines in its retracted position. In the extended position, the solenoid 36 is actuated by an input signal, and therefore solenoid arm 38 is pulled in against spring 44 to its innermost position with respect to the solenoid housing. In this position, the arm 56 is rotated about the pivot 54 to its maximum clockwise extent.

Dog 64 is normally constrained by spring 60 to rotate with arm 66 in a clockwise direction about pivot 54. However, as it does so, it encounters eccentric 72 which lies above the path of arm 56 but is directly in the path of dog 64 (see FIGS. 2 and 4). Thus, when arm 56 is rotated to the position shown, dog 56 rotates with it about pivot 54 only part way; on encountering eccentric 72, dog 64 ceases rotating with arm 56 in a clockwise direction about pivot 54 and effectively begins rotating in a counterclockwise direction with respect to arm 56 about pivot 66. This lifts crown **64*a* away from engagement with stylus 16** and releases the stylus against the drum.

When the actuating signal applied to solenoid 36 is again cut off, spring 44 forces yoke 38 outwardly with respect to solenoid 36. This rotates arm 56 in a counterclockwise direction about pivot 54. Dog 64 is initially prevented from rotating with arm 56 by spring 60 until arm 56 again returns to the point at which dog 64 contacted eccentric 62 and began moving away from stylus 16. The effect of holding dog 66 stationary during this interval and rotating arm 56 in a counterclockwise direction about pivot 54 is equivalent to rotating dog 64 in a counterclockwise direction about pivot 66. This returns dog 64 into frictional engagement with stylus 16 which is then gripped between crowns **64*a* and 68*a*. Further counterclockwise rotation of arm 56 about pivot 54 carries stylus 16** away from the drum into the position shown in dotted lines in FIG. 5.

In summary, as long as solenoid 36 is not actuated, spring 44 forces yoke 38 to its outermost position. At this time arm 56 is rotated about pivot 54 to its maximum counterclockwise position and stylus 16 is held away from drum 34 between dogs 64 and 68. Loading and unloading operations may now take place without interference from the stylus. If solenoid 36 is now actuated by applying an electrical input to it, yoke 38 is pulled inwardly to solenoid 36 and arm 56 is rotated to its maximum clockwise position beyond eccentric 72. This rotates dog 64 about pivot 66 away from stylus 16. Spring **16*b* then forces stylus 16 against drum 34** for reproduction of a document.

In the course of time, stylus 16 erodes from constant contact with the copy being made. As stylus 16 erodes, spring portion **16*b* continuously feeds unworn, fresh stylus to the copy so that the reproduction is not interrupted. Further, since the stylus is effectively continuously being moved forward toward the copy, the portion of the stylus which is tightly gripped between the crowns 64*a* and 68*a*** is continuously changing, thereby insuring that these surfaces do not "punch through" the fine stylus and break it due to constant contact with it.

It will be recalled that plug 73 is tightly but rotatably mounted within the forward end of the housing section 12 of the cartridge 10. The position of eccentric 72 within aperture 21 may be adjusted by suitably rotating the eccentric within the aperture to vary the point at which dog 64 contacts eccentric 72 and ceases to rotate with arm 50 about pivot 54. This allows one to vary the point at which the stylus is released and engaged to thereby compensate for variations in manufacturing tolerances and for wear of the dogs 64 and 68.

As noted previously, carbon particles and other efflux from the copy-sheet are produced during the reproduction process. Most of this material is removed from the copy 35 by the vacuum generated within the nozzle 37. Some of this material, however, clings to the tip of stylus 16 and effectively increases its thickness as it coats the stylus. When the stylus is retracted into cartridge 10 after a reproduction, therefore, the thickened tip is not retracted into the boot 22. Instead, it presses against the boot and "puckers" it inwardly so that the residue on the tip remains outside the boot at all times as shown in FIG. 6 of the drawings which is a side view of cartridge 10 with stylus 16 in the retracted position. The stylus-retracting stroke of the dogs is of such a length that only that portion of the stylus which has at all times been kept clean by the boot is withdrawn into the bushing. Thus it follows that the deformable length of the boot is at least equal to the distance the stylus is retracted. When the stylus is again moved outwardly against the drum, the boot assumes its undistorted shape. Thus, the boot 22 protects the narrow channel in the bushing 20 through which the stylus extends and prevents its "fouling" from efflux generated during reproduction.

The size of the components of the stylus system has been greatly increased for illustrative purposes, although the relative sizes and positions of the parts are generally accurately indicated. Thus, the overall length of the stylus, from its tip to the rear of the spring portion, is of the order of 2.5 inches, while the length of the spring portion alone is approximately 0.4 inch; its width is also approximately .4 inch. It is preferably formed from a fine "music" wire of stainless steel approximately .01 inch in diameter. Thus, the stylus is quite compact. Due to the relatively long length of the stylus tip **16*a* (which, in the preferred embodiment, extends a full inch out from the boot when it is free of the dogs 64 and 68) considerable usage is required to wear the stylus before it must be replaced. Thus, present tests indicate that the stylus 16** is capable of producing of the order of at least 2000 8½ x 11 reproductions before replacement is required. This contrasts strongly with other stylus systems presently available in which the number of such reproductions obtainable before replacement is often less than 100.

The stylus cartridge may advantageously be formed from a plastic material such as Lexan. This possesses adequate strength and rigidity and also provides electrical insulation for stylus 16 which it encloses. Bushing 20 may advantageously be formed from a tool steel heat treated to a hardness of approximately 60 on the Rockwell "C" scale. In order to withstand the high stylus temperatures which may be generated during reproduction, the boot 22 is preferably formed from a high temperature resistant material suchs as Teflon.

From the above, it will be seen that I have provided an improved stylus system. The system includes a novel stylus, an improved cartridge for holding the stylus, and an improved actuator mechanism for withdrawing the stylus from the document being reproduced after the reproduction process is completed. The stylus is laterally supported by a bushing through which the stylus extends and which, in conjunction with the actuator mechanism, enables the use of a longer stylus and thus leads to dramatically increased stylus life.

The stylus is easily replaced in the cartridge, even by one with little mechanical skill, without damage to the stylus. The cartridge and its actuating mechanism are easily separated and removed from the facsimile receiver for repair or replacement. The stylus is automatically retracted at the end of each reproduction cycle and is held away from the drum as long as the solenoid is not actuated. Thus, if the facsimile system is accidentally turned off in the middle of the reproduction cycle, the stylus will be retracted as long as the solenoid input signal is cut off and will remain safely in this position until the solenoid is again actuated.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A stylus cartridge assembly for a rotary drum facsimile system, said stylus comprising:
- (1) a stylus having:
  - (a) a stylus tip portion for contact with a document on which a reproduction is to be made,
  - (b) a spring forming portion integral with said tip portion and formed around a central axis line coincident with the axis line of said stylus tip,
  - (c) a third portion integral with the spring forming portion and forming a means to secure said stylus to said housing and
- (2) a housing comprising an elongated central cavity for receiving said stylus, said housing being of such length that said stylus, when unstressed, occupies only a portion thereof.

2. A stylus according to claim 1 in which the tip portion and the spring-forming portion are separated by a relatively straight body section for contact with an actuator to move the tip portion with respect to the spring-forming section at selected times.

3. A stylus according to claim 1 wherein said connecting means comprises an eyelet.

4. A stylus according to claim 1 wherein said housing is formed of:
- (1) a first housing element for enclosing said stylus; and
- (2) a second housing element
  - (a) matable with said first housing element for enclosing said stylus; and
  - (b) adapted to expose a part of said straight portion of said stylus for contact with said actuating mechanism for moving said stylus with respect to said housing elements at selected times.

5. A stylus cartridge for a rotary drum fascimile system, as defined in claim 1, the housing of said cartridge comprising:
- (1) a first housing element for enclosing said stylus,
- (2) a second housing element which is matable with said first housing element for enclosing said stylus and is adapted to expose a portion of said stylus for contact with an actuating mechanism for moving said stylus with respect to said housing elements at selected times, and
- (3) wherein said cartridge includes a guide element associated with said cartridge and having a narrow channel communicating between the interior and exterior of the cartridge for reception of the forward portion of the stylus therein, said guide element providing a restraint against lateral motion of the stylus when the stylus is in contact with a document being reproduced.

6. A stylus cartridge as defined in claim 1 wherein said housing has means forming a channel for laterally supporting said stylus when a reproduction is being made and wherein said stylus has a body portion releasably held within the cartridge and of greater length than the tip portion emergency from the channel; and whereby said body portion may be increasingly advanced through said channel as said stylus is eroded during reproduction, and bias means to urge said tip portion into contact with said copy sheet.

7. A stylus cartridge according to claim 6 in which the stylus tip protrudes no more than ¼ inch beyond the channel-forming means when the cartridge is positioned for reproduction and in which the body portion in the interior of the cartridge which is extensible outwardly of said channel is at least ½ inch in length whereby a reserve supply of stylus material is formed within said cartridge for feeding to a copy sheet as the stylus tip is eroded.

8. A stylus cartridge for a rotary drum facsimile system, said cartridge comprising:
- (1) a stylus
  - (a) of relatively thin, durable material;
  - (b) having a first relatively straight body portion forming a tip for contact with a document on which a reproduction is to be made; and
  - (c) having a second portion forming a coiled spring integral with said stylus for providing a biasing force thereto;
- (2) a first housing for enclosing said stylus;
- (3) a second housing element
  - (a) matable with said first housing element for enclosing said stylus, and
  - (b) adapted to expose a portion of straight portion of said stylus for contact with said actuating mechanism for moving said stylus with respect to said housing element at selected times; and
- (4) wherein said second housing element comprises means forming a laterally open arch exposing a portion of said stylus for contact with a pair of grippers.

9. A stylus cartridge for a rotary drum facsimile system, said cartridge comprising:
- (1) a stylus
  - (a) of relatively thin, durable material;
  - (b) having a first relatively straight body portion forming a tip for contact with a document on which a reproduction is to be made; and
  - (c) having a second portion forming a coiled spring integral with said stylus for providing a biasing force thereto;
- (2) a first housing element for enclosing said stylus; and
- (3) a second housing element
  - (a) matable with said first housing element for enclosing said stylus;
  - (b) adapted to expose a portion of straight portion of said stylus for contact with said actuating mechanism for moving said stylus with respect to said housing element at selected times; and
- (4) a flexible protective boot connected to the cartridge, the stylus tip extending through said boot, said boot resiliently deforming inwardly when the stylus is retracted into the cartridge a limited amount to thereby maintain a limited portion of the stylus tip outside the boot when the stylus is so retracted.

10. A stylus actuator for a rotary drum facsimile receiver, said actuator comprising:
- (A) a solenoid
  - (1) for actuation by an electrical input signal;

(2) having a solenoid arm for movement with respect to the solenoid in accordance with said input signal;

(B) an actuator arm (1) pivotally connected to the solenoid arm;

(2) having a pair of grippers forming opposed surfaces for engaging a stylus therebetween at selected times, at least one of said surfaces having a raised portion for contact with said stylus;

(3) having means pivotally mounting at least one of said grippers on said actuator arm;

(4) including means urging said at least one gripper into firm contact with said stylus;

(5) whereby said grippers are maintained in engagement with said stylus during said selected times.

11. A stylus actuator according to claim 10 in which movement of the solenoid arm in a first direction rotates said actuator arm about a first pivot, said at least one gripper initially rotating about said first pivot for a predetermined interval and subsequently rotating about a second pivot in a direction opposite to the direction in which the actuator arm rotates to thereby release the stylus for engagement with the document to be reproduced.

12. A stylus actuator according to claim 10 which includes a pin mounted in predetermined relation to said actuator arm for contact with said at least one gripper when said gripper has moved for said predetermined interval to thereby reverse the direction of rotation of said gripper.

13. A stylus actuator according to claim 12 in which said pin is adjustably mounted on the actuator arm whereby the duration of said predetermined interval may be varied.

References Cited

UNITED STATES PATENTS

| | | | |
|---|---|---|---|
| 2,718,450 | 9/1955 | Leonard et al. | 346—139 X |
| 2,723,897 | 11/1955 | Zabriskie | 346—139 |
| 2,916,343 | 12/1959 | Alden | 346—139 X |
| 2,938,761 | 5/1960 | Zabriskie | 346—139 |
| 3,214,764 | 10/1965 | Williams | 346—139 X |
| 3,328,804 | 6/1967 | Morse | 346—139 |

JOSEPH W. HARTARY, Primary Examiner

U.S. Cl. X.R.

178—94